United States Patent [19]

Phillips et al.

[11] Patent Number: 5,014,346

[45] Date of Patent: May 7, 1991

[54] ROTATABLE CONTACTLESS ANTENNA COUPLER AND ANTENNA

[75] Inventors: James P. Phillips, Lake In The Hills; Robert M. Johnson, Jr., Palatine; Michael W. Zurek, St. Charles, all of Ill.

[73] Assignee: Motorola, Inc., Schaumburg, Ill.

[21] Appl. No.: 140,523

[22] Filed: Jan. 4, 1988

[51] Int. Cl.[5] .......................... H04B 1/18; H01Q 1/24

[52] U.S. Cl. .......................................... 455/89; 455/90; 455/280; 455/348; 379/433; 343/702; 343/882

[58] Field of Search ...................... 455/89, 90, 83, 347, 455/348, 349, 351, 269, 280; 379/428, 433, 440; 343/702, 869, 873, 872, 882

[56] References Cited

U.S. PATENT DOCUMENTS

| | | | |
|---|---|---|---|
| 3,049,711 | 8/1962 | Hooper | 343/702 |
| 4,001,830 | 1/1977 | Ishimaru et al. | 343/882 |
| 4,121,218 | 10/1978 | Irwin et al. | 343/702 |
| 4,313,119 | 1/1982 | Garay et al. | 343/702 |
| 4,471,493 | 9/1984 | Schober | 455/90 |
| 4,571,595 | 2/1986 | Phillips et al. | 343/745 |
| 4,644,366 | 2/1987 | Scholz | 343/702 |
| 4,740,794 | 4/1988 | Phillips et al. | 343/702 |
| 4,816,838 | 3/1989 | Mizuno et al. | 343/702 |
| 4,845,772 | 7/1989 | Metroka et al. | 455/90 |

FOREIGN PATENT DOCUMENTS

| | | | |
|---|---|---|---|
| 0086929 | 4/1988 | Japan | 455/89 |

*Primary Examiner*—Benedict V. Safourek
*Assistant Examiner*—Ralph Smith
*Attorney, Agent, or Firm*—Timothy W. Markison; Steven G. Parmelee; Joseph P. Krause

[57] ABSTRACT

A rotatable contactless RF signal coupler, which couples RF signals between an antenna and an RF signal processor in a portable radio, along with an antenna capable of operating in two modes is described herein. Specifically, the signal coupler includes a transformer that is primarily located within the hinge formed by the housing of the radio and a rotatable flip portion. Substantially constant inductive coupling is maintained in the coupler regardless of rotation. The antenna is capable of operating in a narrow band and a wide band mode to afford antenna operation through varied conditions.

16 Claims, 2 Drawing Sheets

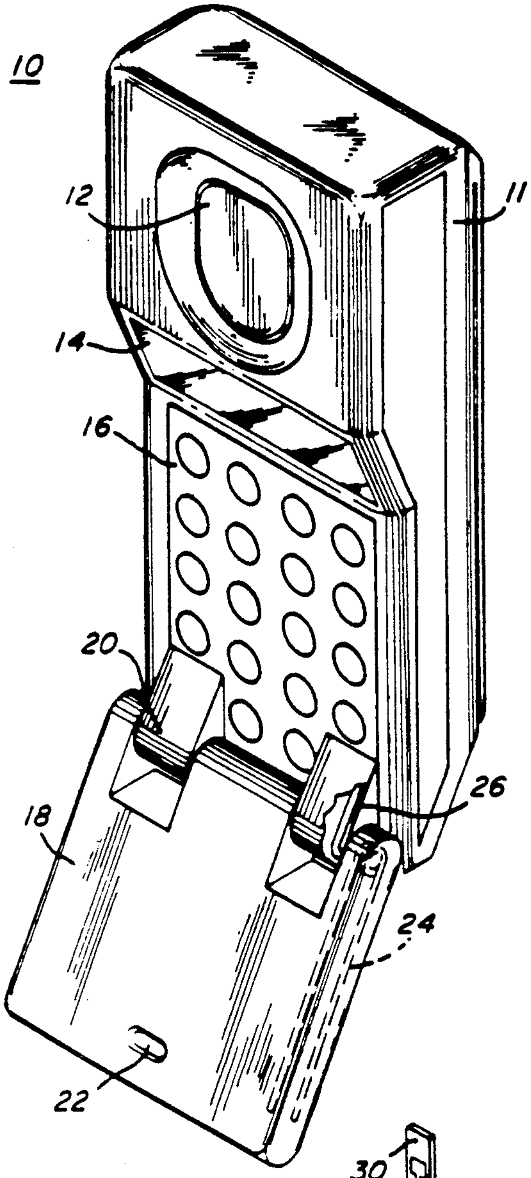
FIG.1
FIG.2B1
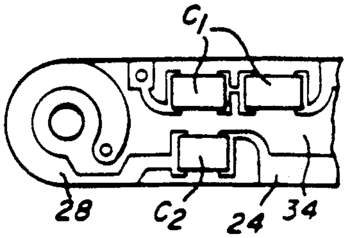
FIG.2B2
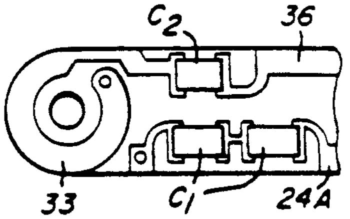
FIG.2A
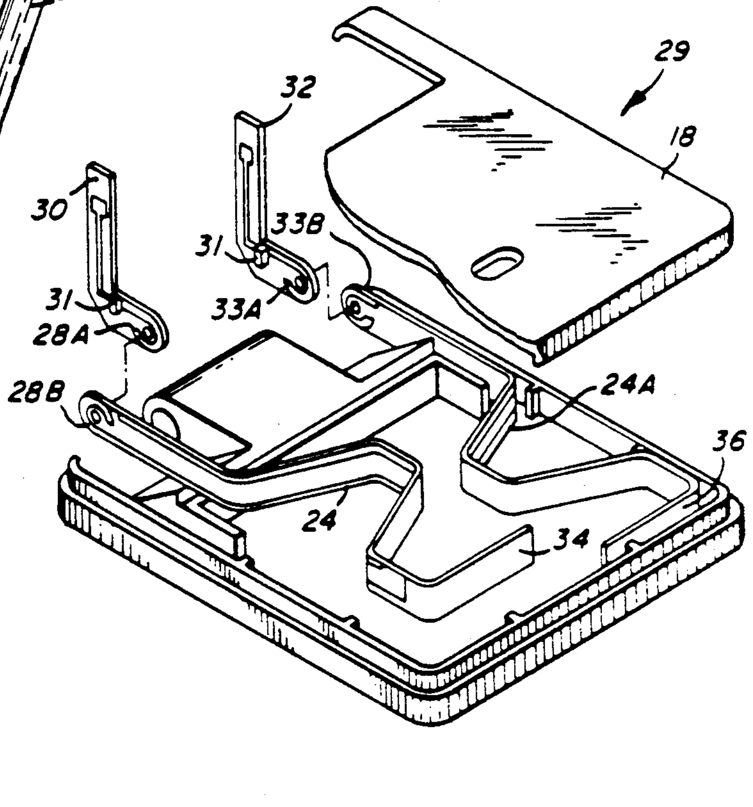

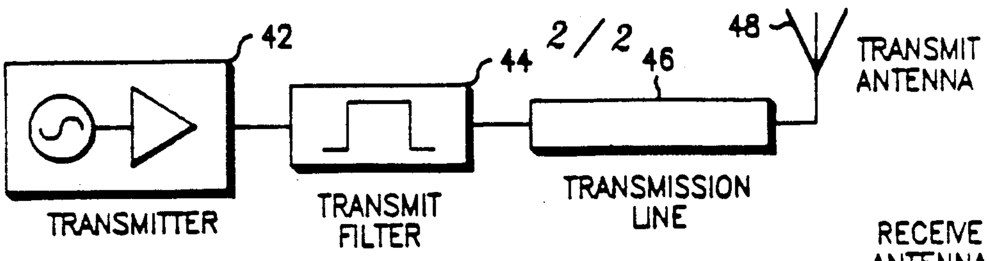
FIG.3A
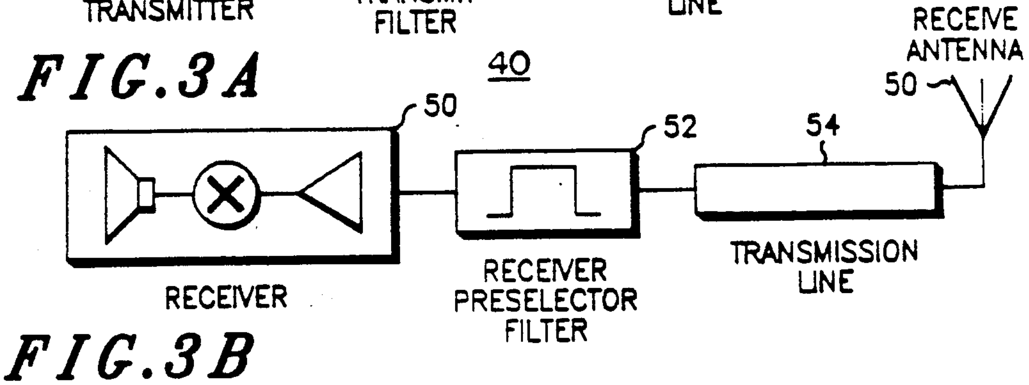
FIG.3B
FIG.4A
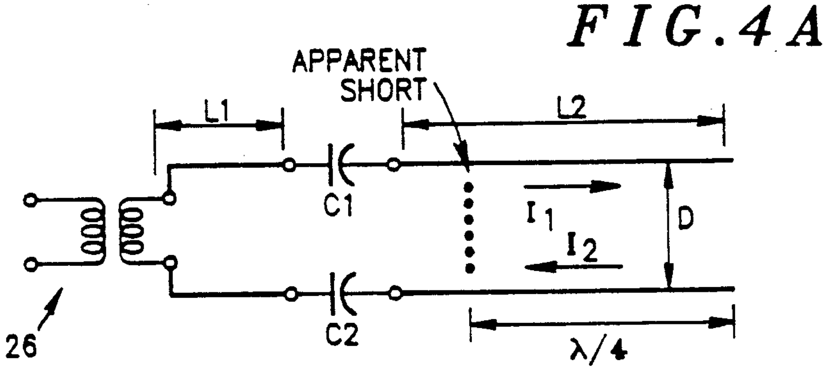
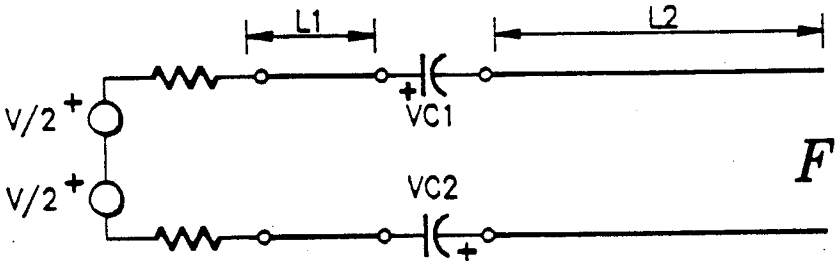
FIG.4B
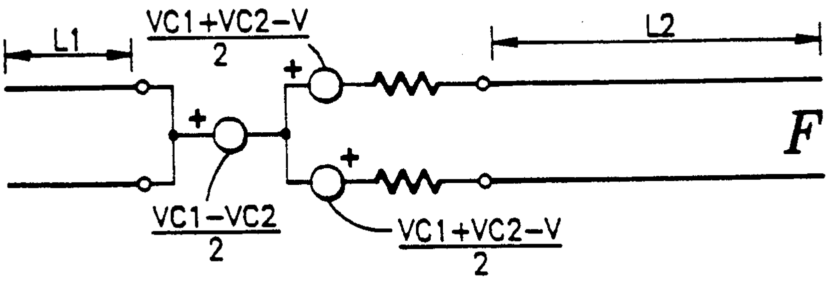
FIG.4C

ROTATABLE CONTACTLESS ANTENNA COUPLER AND ANTENNA

BACKGROUND OF THE INVENTION

This invention is directed generally to couplers which permit a transfer of AC energy between objects which rotate relative to one another and to an antenna capable of operating in two modes. The contactless coupler is more specifically directed to a rotatable contactless signal coupler which couples RF signals between an antenna and an RF signal processor, such as a transmitter or a receiver, in a two-way radio.

A difficulty exists whenever AC energy must be transferred between objects which rotate relative to one another. Sliding contacts are one solution but they have limited life due to wear and may cause electrical noise. Flexible cables are another solution but these limit the rotation and also often cause wear and noise.

The conventional means for coupling signals, in portable two-way radios and pagers, between the antenna and the signal processor has been through the use of a coaxial connector found within the housing of the particular device. Where the antenna is required to rotate relative to the radio a new type of device is needed which is small, inexpensive, efficient, and highly reliable for coupling RF energy to the antenna. This is especially important where the antenna is to be located on a flip portion of a portable two-way radio.

Portable radios operate in varied and adverse locations. The desire for smaller radios has severely limited the available antenna locations and has degraded antenna performance due to its size and placement within the device. For maximum performance the antenna should be as far as possible from the operator. Newer models of the portable radios have been designed with a flip that folds down for talking and folds up for storage in the pocket. The flip portion is a good antenna location and the main case is usually allocated for the radio electronics. The variations in proximity of the antenna to the case and operator is so great that optimizing for any one condition will invariably degrade performance in other equally likely conditions. Therefore, the optimal antenna will be the one most tolerant of the varying conditions.

SUMMARY OF THE INVENTION

It is an object of this invention to provide an improved portable radio having an antenna coupler which does not use a direct mechanical connection between the antenna and the RF signal processor of the radio.

It is also an object of this invention to provide a coupler that can be used at high AC frequencies to transfer power efficiently through a non-wearing rotary joint.

It is another object of this invention to provide an improved antenna system for a portable radio that is disposed substantially within a flip portion of the radio, the flip portion being rotatable with respect to the radio housing containing the radio electronics.

It is a further object of this invention to provide an antenna that is capable of operating in two modes.

In accordance with one aspect of this invention, there is provided a portable radio that comprises a housing and a hinged flip portion attached to the housing by hinge means for permitting rotation about an axis formed by hinge means and the housing. The radio further includes means for processing RF signals disposed within the housing, a first antenna disposed within the flip portion and means for coupling RF signals between the antenna and the signal processing means partially disposed coaxially within the hinge means. The coupling means comprises a first transformer having primary coil means and secondary coil means, the primary coil means being coupled to the signal processing means and the secondary coil means being coupled to the first antenna. The primary and secondary coil means are positioned coaxially with the hinged means such that substantially constant inductive coupling therebetween is maintained over a range of rotation and substantially constant signal coupling between the antenna and the signal processing means occurs regardless of rotation.

In accordance with another aspect of this invention there is provided an antenna system for a portable radio which comprises antenna means and rotatable contactless means for coupling RF signals between the antenna means and an RF signal processor in the radio. The system is disposed substantially within a flip portion of the radio that is rotatable with respect to the radio housing containing the signal processor and is attached by hinge means to the radio housing.

In accordance with another aspect of this invention, there is provided a dual mode antenna for a portable twoway radio which comprises a first two conductor transmission line means of predetermined length, each of the conductors being coupled to a series capacitor. Each of the capacitors is coupled to an open ended second two conductor transmission line means, second transmission line means having an effective electrical length greater than a quarter wavelength such that an apparent short circuit is created at a point along second transmission line means that is about a quarter wavelength from the open end.

In accordance with a further aspect of this invention, there is provided a portable radio that comprises a housing and a hinged rotatable portion attached to the housing by hinge means for permitting rotation about an axis formed by hinge means and the housing. The radio further includes means for processing RF signals disposed within the housing; an RF electrical component disposed within said hinged portion; and rotatable contactless means for coupling RF signals between RF signal processing means and the RF electrical component, rotatable contactless means being partially disposed coaxially within hinge means.

BRIEF DESCRIPTION OF THE DRAWINGS

FIG. 1 is perspective view of a hand held two-way radio which utilizes an antenna coupler according to the present invention.

FIGS. 2A, 2B1 and 2B2 illustrate enlarged exploded views of the antenna coupler and antenna according to the teachings of the present invention.

FIG. 3 is a block diagram illustrating a portable two-way radio coupled to separate transmit and receive antennas.

FIGS. 4A thru 4C are schematic diagrams of the dual mode antenna of the present invention.

DETAILED DESCRIPTION OF THE PREFERRED EMBODIMENT

For a better understanding of the present invention, together with other and further advantages and capabilities thereof, reference is made to the following disclosure and appended claims in connection with the above described drawings.

With particular attention to FIG. 1, there is illustrated a hand held two-way radio 10 which is comprised of a housing 11, an earphone or speaker 12, a visual display 14, an input keypad 16, and a hinged flip portion 18 attached to housing 11 by hinge means 20. Hinge means 20 permits rotation of flip or rotatable portion 18 about a hinge axis formed by hinge means 20 and housing 11. Radio 10 also includes a microphone port 22 and a first antenna 24 disposed within flip portion 18. Radio 10 further includes therein means for processing RF signals and a means for coupling RF signals 26 which is partially disposed coaxially within hinge means 20.

Referring now to FIG. 2A, coupling means 26 is comprised of a first transformer having primary coil means 28A and secondary coil means 28B, primary coil means 28A coupled or connected to signal processing means within radio housing 11 and secondary coil means 28B coupled or connected to first antenna 24. Primary coil means 28A and secondary coil means 28B are positioned coaxially within hinge means 20 along the hinge axis (as illustrated in FIGS. 1 and 2) such that substantially constant inductive coupling therebetween is maintained over a range of rotation and the signal coupling between antenna 24 and the signal processing means occurs regardless of rotation. The magnetic coupling between the coils does not change substantially as the hinge is moved.

The transformer coupler of coupling means 26 consists of 2 tuned circuits in close proximity and has the added advantage of providing the capability of coupling unbalanced to balanced transmission lines. This capability of coupling between different transmission line types can be used to an advantage because many antennas require balanced input and most RF circuitry is configured to be connected to unbalanced transmission lines. These tuned transformers have the restriction that the coupling and therefore the spacing between the coils has an optimum value. This precludes allowing any substantial lateral or axial movement of one coil with respect to another. However, the rotation of one coil with respect to another is permitted and thus RF energy can be transferred across a hinge or rotating joint by this device.

Coupling means 26 may also be considered a rotatable contactless means for coupling RF signals between the radio's RF signal processor and some other RF electrical component since the transfer of RF energy across a hinge or point occurs without coil contact and occurs regardless of rotation. The other RF electrical component may be an antenna or another RF signal processor. This capability in a radio would allow components, such as transmitters or receivers, to be split in two between the housing and the hinged portion of the radio and be coupled together via the rotatable contactless means.

In one embodiment of the invention, a pair of two turn closely wound coils made of 0.020 inch diameter wire form a transformer that passes RF energy with less than 0.25 db loss over a 150 MHz bandwidth at a center frequency of about 850 MHz. Both coils have an inside diameter of about 0.2 inch and are spaced 0.060 inch apart. A capacitor valued at 0.9 pfd is coupled in series with each of the coils in order to compensate for the leakage inductance of each coil. In another embodiment of the invention, the transformer and the antenna are formed from patterns on a circuit board.

Referring further to FIG. 2A, there is illustrated an antenna system 29 that includes an embodiment of coupling means 26 in the form of conductor traces on double sided printed circuit boards. Specifically, primary coil 28A is disposed on a first circuit board or coupler board 30. In a system where coupling means is comprised of two transformers, a second transformer having a primary coil 33A is disposed on coupler board 32 as illustrated. Secondary coils 28B and 33B are disposed on second circuit boards or antenna boards 34 and 36, respectively. Coupler boards 30 and 32 allow impedance matching between primary coils 28A and 33A and the radio's interface by using a series capacitor 31 that is located on each of the coupler boards.

Referring to FIGS. 2A and 2B, secondary coils 28B and 33B are substantially similar to primary coils 28A and 33A, however, each end of the secondary coils are connected to capacitors C1 and C2, as illustrated, and are then connected to the conductor traces on the printed circuit board that act as transmission line elements for antennas 24 and 24A. The ratio of the capacitor impedances set the sum and difference currents of the transmission line elements of antenna 24. (see FIG. 4). The values of the capacitors along with the length and spacing of the transmission line elements of the antenna determine the resonant frequency of the antenna.

First printed circuit boards or coupler boards 30 and 32 are located within housing 11 and are attached at hinge means 20. Second printed circuit boards or antenna boards 34 and 36 are located within flip portion 18 and are attached at hinge means 20. The distance between the coupler boards and the antenna boards appears optimum at 0.020 inch spacing. The tolerance of this dimension should be held to +/−0.005 inch to insure maximum performance.

The length of the second transmission line conductors on antenna boards 34 and 36 should be slightly greater than a quarter wavelength at the operating frequency. To accommodate the antenna's length within flip portion 18, the transmission line elements of the antennas were formed in a serpentine configuration on the antenna boards so that the entire antennas may fit within flip portion 18. The performance of the antennas is slightly degraded by this configuration but such a configuration minimized degradation of radiation.

Referring again to FIG. 2B, capacitors C1 and C2 are ceramic chip capacitors which are coupled to the transmission line elements of antenna 24. In another embodiment, capacitor C1 can be created from areas on opposite sides of antenna board 34 or 36 on which the antenna is constructed. Capacitor C2 requires, on the other hand, more capacitance and the area required will be too large if the antenna board is used for the dielectric. One solution is to have an overlay capacitor of about 0.010 inch thick alumina attached to the board with a strap. This would be the only protruding part on either the antenna or the transformer antenna board. This part could be contained in a small cavity molded into flip portion 18.

Referring now to FIG. 3, this figure illustrates a block diagram of a portable two-way radio coupled to separate transmit and receive antennas. In one embodiment of the radio, means for processing RF signals is disposed within the radio housing separate from the antenna (the antenna may be disposed within flip portion 18). The RF signal processing means may include either a transmitter and/or a receiver or a plurality of receivers, depending on the application. In the embodiment illustrated in FIG. 3, the radio includes a transmitter 42, a transmit filter 44, a transmission line 46 and a transmit antenna 48. The radio may also include a receiver 50, a receiver preselector filter 52, a transmission line 54, and a receive antenna 56. All of these components, except for the antenna, may be contained on a single circuit board which is housed within radio housing 11. The board provides two sets of antenna terminals one for the transmitter and one for the receiver, each terminal being connected to a primary coil of one of the transformers that is disposed on a coupler board.

Where the RF signal processing means of the radio includes a transmitter and a receiver, the transmitter is coupled though hinge means 20 (see FIG. 2A) to first antenna 24 by first transformer 28. The receiver is coupled through hinge means 20 to second antenna 24A by second transformer 33. Where the RF signal processing means includes a plurality of receivers, a first receiver would be coupled by first transformer 28 through hinge means 20 to first antenna 24. A second receiver would be coupled by a second transformer to a second antenna.

The transmission lines on the radio circuit board are used to provide RF hookup between the coupler boards and either the transmitter or receiver. Their length can be whatever length is necessary to reach the coupler boards. In one embodiment the transmission line is in stripline form The minimum length is that which is necessary to provide a connection with minimal electrical loss along the transmission line. The impedance of the transmission line is 50 ohms as this is the designinterface impedance between the coupler boards and the receiver or transmitter.

The separation of the antennas, as illustrated in FIG. 2A, from each other is not critical to the antenna design. The effect of close proximity of the receive antenna on the transmit antenna can be compensated by modification of the transmit antenna and likewise for the effect of the transmit on the receive antenna. The less effect that one antenna has on the other, the higher the isolation is from one antenna to the other. This electrical isolation is affected by polarization, spacing, the pattern, and bandwidth of the antennas. A reduction of the requirements for the transmit filter 44 and receiver preselector filter 52 is possible due to increased antenna isolation.

Receivers in close proximity of a transmitter often suffer degraded performance due to interference from the transmitter. The most common method of reducing this degradation is to provide electrical isolation between receiver 50 and transmitter 42. Isolation is usually obtained from frequency filters connected between the receiver and the antenna and the transmitter and the antenna. However, if separate transmit and receiver antennas are used, as in FIG. 3, some amount of electrical isolation between the antennas will exist and can be used to reduce interference. The electrical isolation of transmit filter 44 and receive filter 52 may be reduced by the amount of isolation between the antennas.

Receiver performance may be improved by decreasing transmitter interference through increased antenna isolation. Isolation is necessary: 1) to reduce transmitter noise occurring in the receive frequency band; 2) to reduce the transmit signal that impinges upon the receive filter; and 3) to reduce spurious signals created in the transmitter.

The total rejection of the transmitter generated noise in the receiver frequency band is the sum of antenna isolation and the transmit filter attenuation in the receive frequency band. The greater the antenna isolation, the less the transmit filter rejection in the receive frequency band is required. The total rejection of the transmit signal that reaches the receiver is the sum of the antenna isolation and the receive preselector filter attenuation in the transmit frequency band. The greater the antenna isolation, the less the receive filter rejection in the transmit band is required. The total rejection of spurious signals created in the transmitter is the sum of antenna isolation and the transmit filter attenuation to the spurious signal and the receive preselector filter attenuation to the spurious signal. The greater the antenna isolation, the less the transmit and/or receive preselector filter attenuation is required. The above three antenna isolation related rejections may often but not always reduce the filter requirements if there are other reasons for the requirements. In one embodiment, the antenna isolation was approximately 10 db and this did reduce the filter requirements.

In an alternative embodiment of the present invention, the transmit and receive filters are duplexed and connected to a single antenna. The bandwidth requirement of a single antenna is now larger than that of the two antenna application since one antenna must have sufficient bandwidth to cover both the transmit and the receive bands simultaneously. The separate antenna approach requires each antenna to cover only a single frequency band. In duplexing the filters, transmission lines such as transmission lines 46 and 54 that connect filters 44 and 52 to a single antenna are duplexed. Here the electrical length of the transmission lines becomes critical.

Duplexing the filters is accomplished by using a transmission line to shift the phase of the transmit filter impedance in the receive frequency band to a near open circuit and using another transmission line to shift the phase of the receive preselector filter impedance in the transmit frequency band is reflected to a near open circuit. These two transmission lines are connected at these near open circuit impedance points and are then connected to the single antenna or a transmission line connected to an antenna. By combining the transmitter and receiver at these points, their effect on each other is minimized. To accomplish repeatable duplexing, which does not require tuning during manufacturing, the electrical length of the transmission lines must be controlled and the stop band impedance of the filters must also be controlled. These two requirements are not necessary in the separate antenna approach.

Antenna isolation is not available when duplexing to a single antenna but there is an improvement in the transmit filter attenuation in the receive frequency band and the receive preselector filter attenuation in the transmit frequency band. This improVement is limited to about 6 db if the filters, transmission lines, and antenna are all matched in impedance and are duplexed. Antenna isolation between separate antennas is not limited theoretically, however antenna isolation is normally limited by the physical separation available within the radio packaging.

The use of an antenna in radio 10 requires that the antenna be tolerant of several conditions. Because it is a dual mode antenna it will operate with one mode dominant in some conditions and will operate with the second mode dominant when the conditions are unfavorable for the first. The design of the two mode antenna in a compact form will be well suited for portable radios where space is very limited and many conditions must be tolerated.

As illustrated in FIG. 4A, the antenna of the present invention is simple and is comprised of three parts. The first part is a short length of a two conductor transmission line designated as L1 from the input to two series capacitors C1 and C2 (part two). Part three is a second length designated as L2 of a two conductor transmission line that is left open ended. The two modes of this antenna result from the relationship of the two currents I1 and I2 flowing in the conductors of L2. One mode has a response over a broad frequency band and is called the wide band mode. The second mode of operation has a response over a narrow band and is called the narrow band mode. The wide band mode radiates with common mode currents while the narrow band mode uses difference mode currents and thus has a much smaller radiation resistance. When flip portion 18 (as illustrated in FIG. 1) is in the extended position, the energy from the antenna radiates in both modes. When the flip portion is folded in, the energy radiates mainly in the narrow band mode. The varied modes of operation are affected by the position of the flip portion and the immediate surroundings of the antenna, such as the operator's hand and head.

FIGS. 4A through 4C, illustrate schematic diagrams of a dual mode antenna. In FIG. 4A, 26 represents the input to the antenna which may be coupling means 26 according to the teachings of this invention. If currents I1 and I2 are equal, their fields cancel and no radiation from these currents occur. This is the normal operation of a transmission line. Because L2 is made longer then a quarter wavelength, there will be a point along the line where an apparent short circuit exists. An actual short circuit may be placed across the line at this point with no effect. Displacement currents will flow through this apparent short and cause radiation which is polarized orthogonal to the wires. This mode of operation has been used in transmission line antennas and provides the narrow band of operation.

The other mode of radiation occurs when I1 does not equal I2. In this case there is a net (I1-I2) current flowing in the transmission line L2 that causes radiation with polarization parallel to the wires. This is the normal operation of an electric dipole antenna. The folded dipole operates in this manner and the excitation of this mode is accomplished by means shown in FIG. 4B and 4C. The basic schematic diagram of FIG. 4B is rearranged through a series of steps using generally accepted circuit theory principles to arrive at FIG. 4C.

As seen in FIG. 4C, this mode is driven by a voltage generator that originates from the difference of the voltages across the two capacitors. Because equal currents flow through the two capacitors, the value of the two capacitors must be unequal. In order to create a net current flow in this configuration capacitors of different values must be used to generate different voltages. Depending on the application, capacitor values can be scaled with frequency. Operation of this antenna in the two modes requires the generation of currents with the correct imbalance to gain advantage of both modes. The ratio of the capacitors is selected to give balance between the two modes. Such ratios range from about 1.5:1 to about 10:1, with 6:1 being the preferred ratio.

As the antenna illustrated in FIG. 1 is placed near arbitrary configurations of conductors, absorbers, and dielectrics, the dominant mode of operation shifts from one to the other. For example, when a portable radio with this antenna is placed parallel to a large conducting surface then the dipole mode is effectively shorted and is rendered inoperative. However, this placement enhances the operation as a transmission line antenna and the antenna remains operative. Had the second mode not been available, performance would have degraded significantly.

In one embodiment, referring to FIG. 4A, the distance D is 0.500 inch, L1 is 0.60 inch, L2 is 3.5 inches, C1 0.75 pfd and C2 is 4.30 pfd. The antenna had a bandwidth of 60 MHz centered at 880 MHz with return loss greater than 10 db.

Thus, there has been shown and described an improved antenna coupler and an antenna for a portable two-way radio. The rotatable contactless antenna coupler of this invention is small, inexpensive, efficient, and highly reliable for coupling RF energy from a signal processing means within a radio to an antenna. In accordance with another aspect of this invention, an improved antenna has been configured to operate in two modes to allow the antenna to operate much more effectively in varied environments. The simplicity and compactness of this particular design is new to portable antenna design.

While there have been shown and described what are at present considered the preferred embodiments of the invention, it will be obvious to those skilled in the art that various changes and modification may be made therein without departing from the scope of the invention as defined by the appended claims.

What is claimed is:

1. A portable radio comprising:

a housing;

a hinged flip portion attached to said housing by hinge means for permitting rotation about an axis formed by said hinge means and said housing;

signal processing means for processing RF signals disposed within said housing;

a first antenna disposed within said hinged flip portion; and coupling means for coupling R.F. signal between said first antenna and said signal processing means partially disposed coaxially within said hinge means, said coupling means comprising a first transformer having a primary coil means and secondary coil means, said primary coil means coupled to said signal processing means, said secondary coil means coupled to said first antenna, said primary coil means and said secondary coil means being positioned coaxally with said hinge means such that substantially constant inductive coupling there between is maintain over a range of rotation and substantially constant signal coupling between said fist antenna and said signal processing means occurs regardless of rotation.

2. The portable radio according to claim 1 wherein said primary coil means is disposed on a first circuit board, said first circuit board located within said housing and attached at said hinge means.

3. The portable radio according to claim 1 wherein said secondary coil means and said first antenna are disposed on a second circuit board, said second circuit board located within said flip portion and attached at said hinge means.

4. The portable radio according to claim 1 wherein said coupling means comprises a second transformer, said second transformer having a primary and a secondary coil means.

5. The portable radio according to claim 4 wherein said R.F. signal processing means includes a transmitter and a receiver, the transmitter is coupled through said hinge means to said first antenna by said first transformer and the receiver is coupled through said hinge means to a second antenna by said second transformer, said first and second antenna being disposed within said flip portion.

6. The portable radio according to claim 4 wherein said R.F. signal processing means includes a plurality of receivers, said first transformer coupling a first receiver through said hinge means to said first antenna and said second transformer coupling a second receiver to a second antenna.

7. The portable radio according to claim 1 wherein said coupling means further includes a set of first circuit boards and a set of second circuit boards, said first circuits boards partially disposed within said housing and having said primary coil means disposed thereon, said second circuit boards partially disposed within said flip portion and having said secondary coil means disposed thereon.

8. An antenna system for a portable radio comprising antenna means and rotatable contactless coupling means for coupling RF signals between said antenna means and an RF signal processor in the portable radio, said antenna system disposed substantially within a flip portion of the portable radio that is rotatable with respect to radio housing containing the RF signal processor and attached by hinged means to said radio housing, wherein the rotatable contactless coupling means comprises;

primary substrate means, operably associated with the RF signal processor, having at least a primary coil disposed on at least one major surface of the primary substrate means for creating magnetic fields of RF signals;

secondary substrate means having at least a secondary coil disposed on at least one major surface of the secondary substrate means, operably associated with the antenna means and the primary substrate means, for establishing proportional representations of the RF signals on the secondary coil, wherein the at least one major surface of the secondary substrate means is substantially parallel to and physically separate from the at least one major surface of the primary substrate means; and rotation means, operably associated with the primary substrate means, the secondary substrate means and the hinged means, for allowing the primary substrate means to rotate with respect to the secondary substrate while substantially maintaining a constant inductive coupling between the primary coil and the secondary coil.

9. The antenna system according to claim 8 wherein said rotatable contactless coupling means is comprised of a second transformer, said second transformer having primary and secondary coil means.

10. The antenna system according to claim 8 wherein said antenna means is comprised of transmission line means.

11. The antenna system according to claim 10 wherein said transmission line means has an effective electrical length greater than a quarter wavelength of the RF signals.

12. The antenna system according to claim 11 wherein capacitors of unequal value are connected to the conductors of said transmission line means.

13. A rotatable contactless coupling apparatus comprising:

primary substrate means having at least a primary coil disposed on at least one major surface of the primary substrate means for creating a magnetic field of a radio frequency signal coupled to the primary coil;

secondary substrate means having at least a secondary coil disposed on at least one major surface of the secondary substrate means, operably associated with, and physical separated from, the primary substrate means, for establishing a proportional representation of the radio frequency signal on the secondary coil, wherein the at least one major surface of the secondary substrate means is substantially parallel to the at least one major surface of the primary substrate means; and hinging means, operably associated wit the primary substrate means and the secondary substrate means, for allowing the primary substrate means to rotate with respect to the secondary substrate means while substantially maintaining a constant inductive coupling between the primary coil and the secondary coil.

14. The rotatable contactless coupling apparatus of claim 13 wherein the primary substrate means further comprises primary capacitance means, operably associated with the primary coil, for allowing impedance matching between the primary coil and a radio frequency signal processor that, at least, provides the radio frequency signal.

15. The rotatable contactless coupling apparatus of claim 13 wherein the secondary substrate means further comprises secondary capacitance means, operably associated with the secondary coil, for allowing impedance variations of the secondary substrate means.

16. The rotatable contactless coupling apparatus of claim 15 wherein the secondary substrate means further functions as a transmission line having a length of approximately one quarter wavelength of the radio frequency signal, such that the secondary substrate performs as an antenna.

* * * * *